June 20, 1939.   G. A. LYON   2,162,736
ORNAMENTAL WHEEL DISK STRUCTURE
Original Filed Nov. 26, 1934
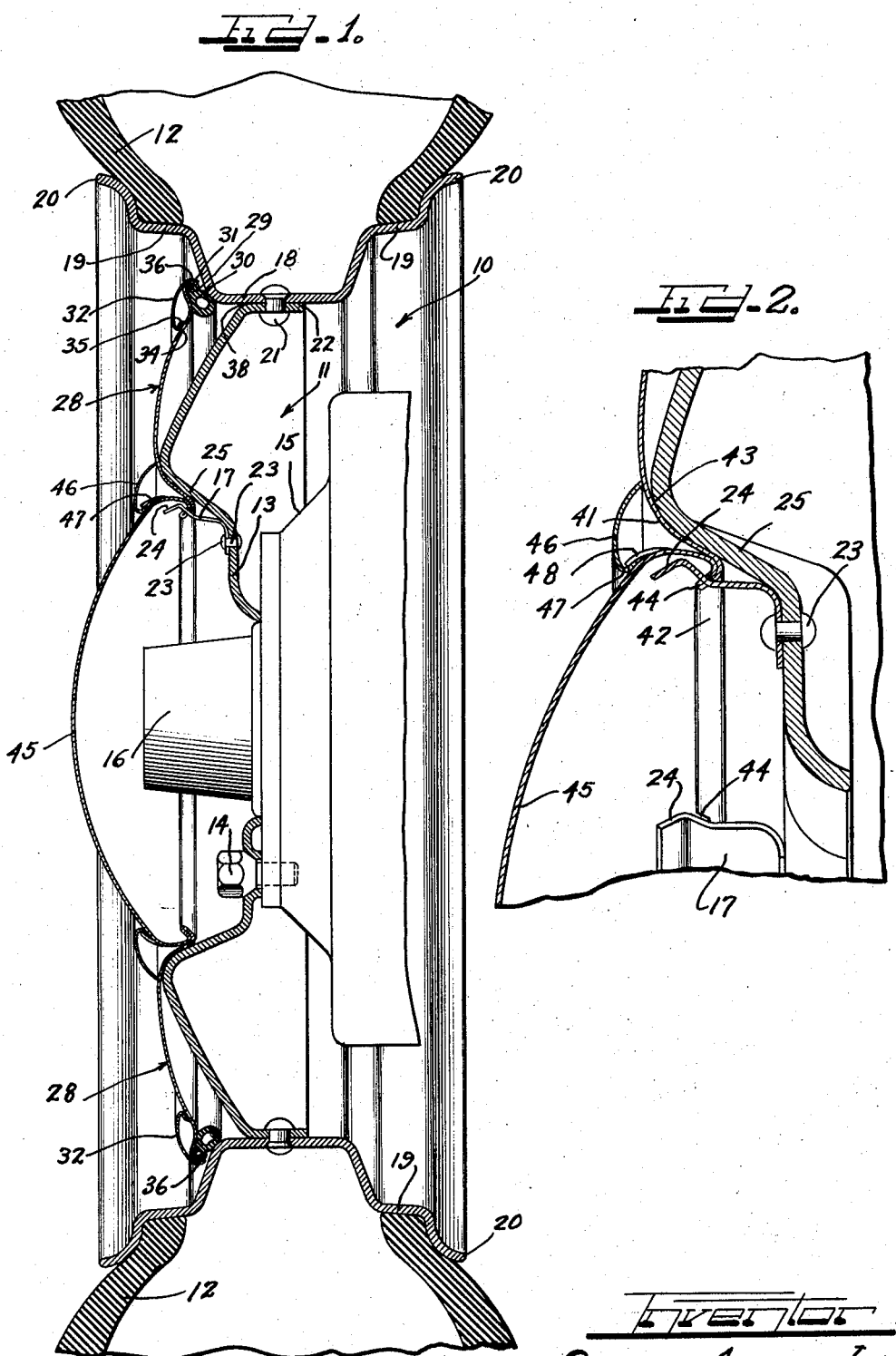
INVENTOR
GEORGE ALBERT LYON.

Patented June 20, 1939

2,162,736

UNITED STATES PATENT OFFICE 2,162,736

ORNAMENTAL WHEEL DISK STRUCTURE

George Albert Lyon, Allenhurst, N. J.

Original application November 26, 1934, Serial No. 754,699. Divided and this application June 4, 1938, Serial No. 211,777

9 Claims. (Cl. 301—37)

This invention relates to an ornamental wheel disk structure, and more particularly to a novel wheel disk and wheel assembly wherein the wheel disk is provided with a fastening flange formed of a double thickness of metal.

This invention is a division of my copending application for Letters Patent of the United States entitled "Ornamental wheel disk structure", Serial No. 754,699, filed November 26, 1934. More specifically, the present invention is carved out of my aforesaid copending application and relates particularly to the embodiment of the invention illustrated in Figure 6 of my aforesaid copending application.

It is an object of the present invention to provide a novel ornamental wheel disk which is ecomonical to manufacture and which is rugged and reliable in use.

It is a further object of this invention to provide a novel wheel disk including a fastening flange for engaging fastening fingers on a vehicle wheel, the fastening flange being formed and arranged in a novel manner.

Another object of the present invention is to provide a novel wheel disk and wheel assembly.

Another and further object of this invention is to provide a novel form of wheel disk having a fastening portion formed of a double thickness of metal which is arranged to detachably engage disk mounting elements on a vehicle wheel, the metal of the disk being of such a thickness that the disk mounting element would deform the metal if it were of a single thickness at its attaching portions, but which will not deform the metal when it is of double thickness.

Another and still further object of this invention is to provide a novel, ornamental wheel disk which is so shaped and arranged to cooperate with the vehicle wheel upon which it is to be mounted that very thin metal may be employed.

Another and still further object of the present invention is to provide a wheel disk which is mounted on a vehicle wheel in a novel manner.

The novel features which I believe to be characteristic of my invention are set forth and described with particularity in the appended claims. My invention itself, however, both as to its organization and manner of construction, together with further objects and advantages thereof may best be understood by reference to the following description taken in connection with the accompanying drawing, in which:

Figure 1 is a sectional elevational view of a vehicle wheel and wheel disk assembly; and Figure 2 is an enlarged fragmentary sectional view showing the wheel disk fastening flange and the manner in which it cooperates with the spring fingers on the vehicle wheel.

Referring now to the two figures of the drawing, the reference character 10 designates generally a drop-center rim or rim part of a wheel which also includes a central or body part generally designated by the reference character 11. The body part of the wheel is secured on the rim, so as to become substantially an integral part thereof, by means of riveting, welding, or the like. The rim part is adapted to accommodate a conventional tire which is designated generally by the reference character 12.

The body part 11 has a central fastening flange 13 which is offset inwardly towards the median plane of the wheel. The flange 13 is adapted to be secured by the usual fastening elements or bolts, such as the cap screws 14, to the usual axle part, such as the brake drum 15 secured to the axle member 16.

Now I propose to provide a disk which will eliminate the necessity of giving the body part 11 of the wheel a high grade finish, and which can be applied to the wheel to cover substantially the entire outer side of the wheel, including all of the body part 11 without the necessity of using a separate hub cap at the center.

At present, it is the practice to use a separate hub cap at the center, cooperable with spring elements, such as the spring elements 17, for concealing the end of the axle 16 and the fastening bolt element 14. This hub cap is designed to be snapped into and out of engagement with the spring elements, and must of necessity be removable so as to permit of access to the fastening elements whenever it is desired to remove the wheel from the axle part.

I also propose to provide a disk for covering the entire body part 11, which is adapted to have all of the advantages of a removable hub cap but which in addition has other advantages, such for example as that relating to its removal and to its covering of the joint between the body part 11 and the rim 10.

Another advantage, of course, relates to the cushioned support of this unitary detachable disk on the rim of the wheel; the cushion being maintained under compression by the snapping of the disk into its retained position over the body part.

I shall now proceed to describe in detail one embodiment of a disk which I have illustrated in the accompanying drawing; the rim 10 is illustrated as being of the drop-center type, and includes a base flange 18 connected to intermediate opposite flanges 19—19, which flanges terminate at their outer extremities in the outer edges 20—20 of the rim.

The base flange 18 of the wheel rim part is illustrated as being connected by means of rivets 21 to a lateral flange 22 on the body part 11 of the wheel. Naturally, in the formation of the body part 11 as well as in the act of riveting it to the rim part, certain manufacturing tolerances are permitted, which tolerances must be taken into consideration in the construction of the wheel, so that the wheel disk will not rattle when the wheel disk is in use.

Also, there is a certain amount of variation in the construction and location of the central spring elements 17, which are usually five in number and are spaced equidistantly from each other about the axis of the wheel. Each of these spring elements 17 has one of its ends secured by means of a rivet 23 to the central fastening portion 13 of the wheel. The free end of each of these elements 17 is formed into a hook-like portion 24, which is resilient and is adapted to cooperate with an inclined surface 25 of the body part 11 in holding my novel disk in retained position on the wheel.

The wheel disk is designated generally by the reference character 28, and is of such a diameter as to cover substantially all of the outer side of the body part 11 of the wheel. This disk 28 is disposed inwardly of the rim 10 and covers all of the space inside of the base flange 18 of the rim part 10. The outer periphery or portion of the disk 28 is provided with a turned edge 29 which embraces the smaller section of a rubber cushioning bead 30, which has a cross-section resembling that of a numeral 8. The larger section of this rubber cushioning bead 30 is adapted to be pressed into engagement with a surface of the rim between the base flange 18 and the intermediate flange 19 on the outer side of the wheel. Both the large and small sections of this bead are formed hollow, and the smaller section has a spring wire ring 31 which is expansible to hold the smaller section of the bead in place under the turned edge 29 of the disk.

In applying this bead to the outer portion of the disk 28, the smaller section of the bead is forced under the turned edge of the disk, and the wire ring 31 then expands by reason of its own resiliency to hold the bead in tight cooperation with the turned edge 29.

The bead 30 may be of either the type shown and claimed in my copending application for Letters Patent entitled "Ornamental wheel disk" filed December 8, 1934, Serial No. 756,569, or that shown and claimed in my issued Letters Patent of the United States, No. 2,082,803, entitled "Bead for ornamental wheel disk and method of applying same."

In order to enhance the appearance of the outer portion of the disk, I provide an ornamental ring or bead 32 which is of curved transverse cross-section. This bead is adapted to have its inner peripheral edge 34 snapped over tangs or fingers 35 pressed out from the side wall of the disk 28. To facilitate this operation, the ring or bead 32 is preferably a slip ring. The outer peripheral edge 36 of the bead 32 is curved around the turned edge 29 of the disk so as to conceal the same and thus materially add to the appearance of the disk. By reason of the location of the outer extremity of the disk as illustrated I am enabled to conceal the joint between the base 18 of the rim and the flange 22 of the body part. This joint normally constitutes a break in a continuous appearance of a side wall of the wheel and is usually an eye-sore for the reason that it is a dirt catcher. By covering this joint, which is designated by numeral 38, I am enabled to materially enhance the appearance of the wheel and to provide the wheel with a symmetrical appearance which is more in accord with the streamlined appointments of modern automotive vehicles.

The bead 30 is preferably maintained under compression when the disk is snapped into retained engagement with the body part of the wheel; that is, this concealed yieldable rubber cushioning member 30 is forcibly pressed into tight engagement with the side surface of the rim as the disk is snapped into a spring retained position over the outer side of the wheel, thereby preventing any tendency of the disk to rattle on the wheel.

The disk 28 is curved outwardly from the bead 30 alongside but spaced from the curved outer surface of the body part 11. This curved portion terminates adjacent the center of the wheel in a depressed section or portion 41 which is shaped similarly to the skirt of a hub cap so that the outer surface of the depressed portion fits over the inclined surface 25 of the body part and is seated thereon. As is clearly shown in the drawing, the depressed section 41 has its sides tightly rolled or otherwise pressed together throughout a substantial portion of its length, the rearward end part being turned radially inwardly and slightly forwardly to provide a turned edge 42 over which the spring elements 17 may extend to detachably hold the wheel disk 28 on the wheel.

By tightly pressing the sides of the depressed section 41 together over a substantial area or, in other words, by providing a tight fold in the metal, the fastening flange 42, which is engaged by the spring elements 17, is formed of a double thickness of metal. This double thickness greatly strengthens the fastening flange 42 and enables the use of a sheet of metal stock of such a thinness that a single thickness of metal would be deformed by the strong resilient action or pressure of the spring elements 17, but which when presented as a double thickness of metal is not deformed by the resilient action or pressure of the spring elements 17. The formation of a fastening flange on a wheel disk in this manner thus greatly reduces manufacturing costs, particularly where a relatively expensive metal, such as stainless steel, is employed to make the wheel disk.

It will furthermore be observed that the ability of the wheel disk to resist the tendency of the spring elements 17 to deform the metal is further enhanced by designing the wheel disk so that the portion 41 thereof immediately adjacent the fastening flange 42 intimately fits around the corner 43 of the shoulder 25. More specifically, the portion 41 of the wheel disk 28 is arranged to be snugly seated on the corner 43 of the shoulder 25, as is shown in the drawing.

As is clearly shown in Figure 2 of the drawing, the fastening flange is slotted as at 44 opposite the spring elements 17 in order to prevent relative rotation between the disk 28 and the body part 11 of the wheel. This feature, however, is not necessary to carry out the teachings of the present invention and may be omitted if it is found that no substantial relative rotation occurs between the disk 28 and the body part of the wheel 11. When the metal which is employed to make the wheel disk 28 is extremely thin, it has been found desirable not to employ the slots 44, for these slots tend to slightly weaken the flange at that point.

Extending from the inner side wall of the flange 42 is a centrally formed bulge portion 45 which extends clear across the axis or center of the wheel so as to conceal the fastening bolts 14 and the axle part 16.

If desired, the open mouth or throat of the depressed portion 41 may be concealed by an ornamental split ring 46 which has its inner peripheral edge underturned, as at 47, to extend over tangs or fingers 48 pressed from the disk. When this split ring or bead 46 is snapped in position so that it is retained on the disk by the fingers or tangs 48, it conceals the open throat of the depressed portion 41 of the disk.

From the above description, it will be seen that I have provided a wheel disk which is extremely economical to manufacture, since it permits the use of very thin sheet metal stock. One form of sheet metal stock which has been found highly desirable for the manufacture of wheel disks of this character is a stainless steel which is slightly resilient in nature. By employing a steel of this character, a high polish may be given the exterior surface of the disk 28. Furthermore, stones, sticks and other objects striking the wheel disk will tend to bounce off the surface of a drum or other diaphragm without leaving a permanent dent in the disk. In other words, all minor deforming forces caused by sudden impacts of small objects to the disk do not leave a permanent dent in the disk by reason of its resilient character and its tendency to resume its normal shape.

In the above description, I have described one embodiment of my invention and have illustrated one particular advantageous shape for the fastening flange 42. It will, of course, be understood that the particular shape and formation given to the fastening flange 42 may vary within wide limits without departing from the spirit and scope of my invention so long as the fastening flange 42 present a double thickness of metal to the spring fastening elements which engage it. It will further be understood that while two ornamental beads or rings 32 and 46 have been described as being mounted on the wheel disk 28, these rings or beads may be eliminated if desired without departing from the spirit and scope of the present invention. Similarly, in connection with the description of the rubber cushioning bead 30, it will be apparent to those skilled in the are that this cushioning bead may also be eliminated without departing from the spirit and scope of the present invention.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In a wheel assembly including a vehicle wheel having a plurality of substantially axially outwardly extending resilient wheel disk mounting fingers and a wheel disk mounted thereon and held in position by the resilient action of said mounting fingers, said wheel disk comprising a central crown portion and an integral ring portion, said crown portion and said ring portion being joined by an integral annular rearwardly extending folded portion.

2. In a wheel assembly including a vehicle wheel having a plurality of substantially axially outwardly extending resilient wheel disk mounting fingers and a wheel disk mounted thereon and held in position by the resilient action of said mounting fingers, said wheel disk comprising a central crown portion and an integral ring portion, said crown portion and said ring portion being joined by an integral annular rearwardly extending folded portion, the side walls of said folded portion being pressed tightly together adjacent their rear extremity.

3. In a wheel assembly including a vehicle wheel having a plurality of substantially axially outwardly extending resilient wheel disk mounting fingers and a wheel disk mounted thereon and held in position by the resilient action of said mounting fingers, said wheel disk comprising a central crown portion and an integral ring portion, said crown portion and said ring portion being joined by an integral annular rearwardly extending folded portion, the side walls of said folded portion being pressed tightly together through a substantial portion of their length.

4. In a wheel assembly including a vehicle wheel having a plurality of substantially axially outwardly extending resilient wheel disk mounting fingers and a wheel disk mounted thereon and held in position by the resilient action of said mounting fingers, said wheel disk comprising a central crown portion and an integral ring portion, said crown portion and said ring portion being joined by an integral annular rearwardly extending folded portion, the side walls of said folded portion being pressed tightly together through a substantial portion of their length, the rear end portion of said folded portion being curved inwardly to form an attaching edge for engagement with said resilient wheel disk mounting fingers.

5. In a wheel assembly including a vehicle wheel having a plurality of substantially axially outwardly extending resilient wheel disk mounting fingers and a wheel disk mounted thereon and held in position by the resilient action of said mounting fingers, said wheel disk comprising a central crown portion and an integral ring portion, said crown portion and said ring portion being joined by an integral annular rearwardly extending folded portion, the side walls of said folded portion being pressed tightly together through a substantial portion of their length to provide a double thickness of metal in said rearwardly extending folded portion for engagement with said resilient wheel disk mounting fingers, whereby metal stock may be employed for said wheel disk of such thinness that a single thickness of metal in said folded portion would be deformed by the resilient action of said fingers, but a double thickness of metal in said folded portion is not deformed by said resilient mounting fingers.

6. For use with an automobile wheel including a portion to which a cover member is to be attached, a circular cover member for disposition over a portion of said wheel comprising a central portion, an outer portion, and a depending skirt connecting said central and outer portions and integral with both arranged to be sprung over a cooperable part of said wheel, said skirt having a double thickness of material where it is adapted to be engaged with said cooperable part of said wheel.

7. For use with an automobile wheel including a portion to which a cover member is to be attached, a circular cover member of relatively thin metallic sheet material for disposition over a part of said wheel comprising a central portion, an outer portion, and a depending skirt connecting said central and outer portions and integral with both arranged to be sprung over a cooperable part of said wheel, said skirt having a folded inner extremity forming a generally radial shoulder where it is arranged to be engaged with said cooperable part of said wheel, and which fold includes closely facing portions for strengthening said thin sheet metal cover member at its place of attachment to said wheel.

8. In a wheel assembly including a wheel and a sheet metal member for disposition on one face thereof, said sheet metal member comprising a central inner portion and an outer portion, said portions being joined by an annular axially rearwardly extending folded portion which is integral with said central and outer portions, the side walls of said folded portion being substantially parallel through a portion of their width, the rear end portion of said folded portion being curved to form an attaching edge, said wheel having means thereon for engaging and seating said attaching edge of said folded portion to detachably retain said sheet metal member on said wheel.

9. A combination comprising a wheel and a cover member for disposition over a part of said wheel, said wheel and said cover member having cooperable portions for attachment to each other, one of said members having a central part and an outer part joined by one of said portions, said one of said portions being integral with both said central part and said outer part and comprising an intermediate integral annular fold having the side walls thereof disposed in closely facing relationship with respect to each other, said annular fold engaging securing means on said other portion to secure said cover member on the wheel.

GEORGE ALBERT LYON.